Aug. 9, 1949.  R. L. SMITH  2,478,787
COFFEE MAKER
Filed Jan. 10, 1946
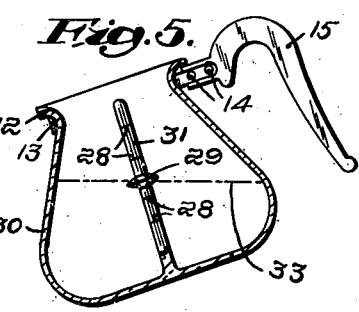
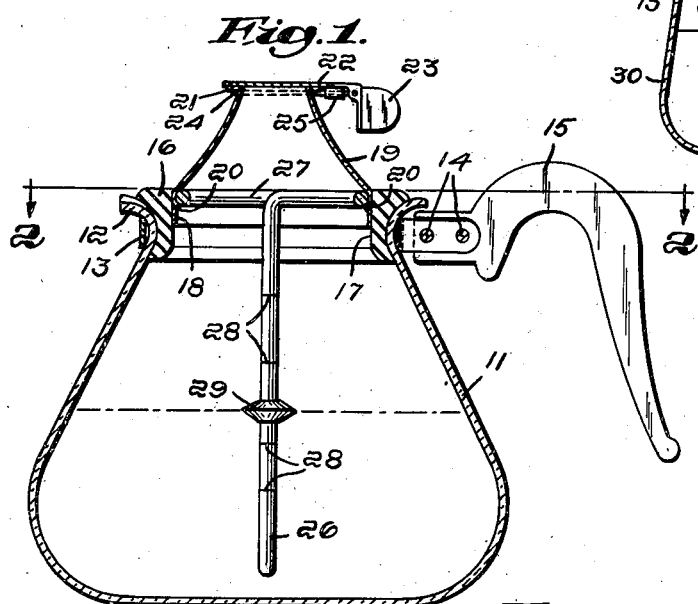
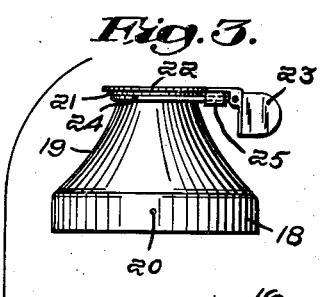
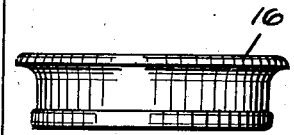
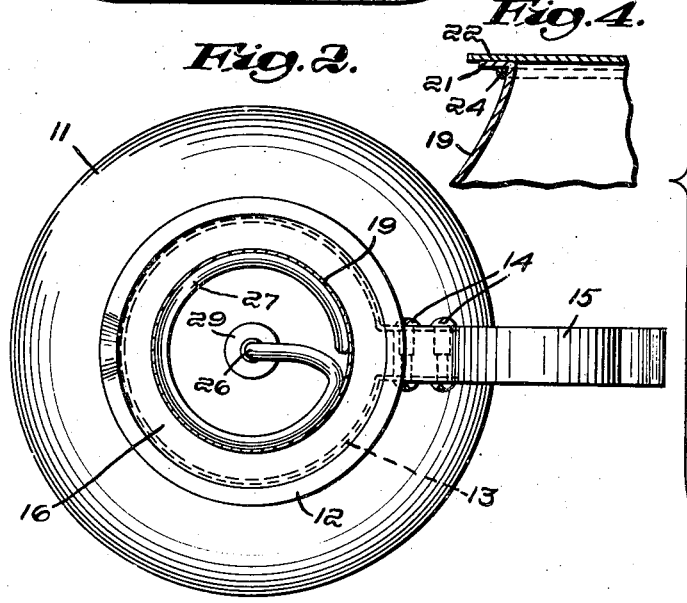
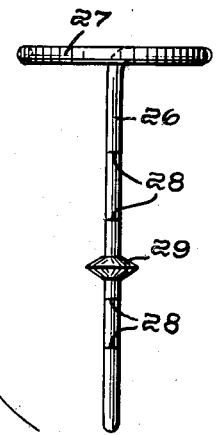
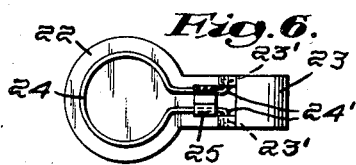
Inventor:
Roland L. Smith,
by Ross Rawlings.
Attorney Patented Aug. 9, 1949

2,478,787

UNITED STATES PATENT OFFICE 2,478,787

COFFEE MAKER

Roland L. Smith, Belmont, Mass., assignor to Nu-products Corporation, Cambridge, Mass., a corporation of Massachusetts Application January 10, 1946, Serial No. 640,180

1 Claim. (Cl. 215—63)

My present invention relates to beverage making apparatus, and more particularly to an improved coffee making apparatus.

For the purposes of this disclosure I shall discuss my invention in its application to a coffee maker. It will be understood, however, that such treatment is illustrative and not limiting and that the principles of my invention are applicable to a wide variety of liquid-containing vessels where it is important that the vessel shall have either a non-drip pouring aperture or shall function as a measure of graduated capacity, or both. Examples of the former include milk bottles and like containers for liquids, and of the latter include laboratory graduates and household measuring cups or the like.

Specifically my invention resides in an apparatus having an improved device incorporated therein or associated therewith for measuring the amount of water to be placed therein for making a required number of cups or helpings of coffee, and for accurately measuring the amount of water even when the pot is held in tilted position during the filling operation. In association with the above, the invention contemplates the provision of an improved anti-drip pouring spout and a counterweighted cover therefor.

Other novel features of the construction and arrangement of parts comprising my improved apparatus will appear as the description of the invention progresses.

In the accompanying drawing illustrating my invention:

Figure 1 is a sectional side elevation of one form of my invention;

Figure 2 is a section plan view taken on the line 2—2 of Figure 1;

Figure 3 is an exploded elevation of the pouring spout, resilient gasket, and improved measurer utilized in the structure shown in Figures 1 and 2;

Figure 4 is an enlarged section through my improved pouring spout particularly illustrating its anti-drip pouring lip, and the counterweighted cover for automatically opening and closing the same;

Figure 5 is a sectional side elevation of a modified form of my invention, and in tilted position; and Figure 6 is a plan detail particularly illustrating the counterweighted cover and its mounting.

Referring to the drawings, and particularly to Figures 1 to 4 inclusive, 11 designates a pot or other liquid holding vessel. Pot 11 is relatively broad at its bottom, and relatively narrow at its top, the top being open and outwardly flared as indicated at 12. The pot 11 may be made of any suitable material, but for cleanliness and utility, I prefer to use glass. Extending around the outer surface of the outwardly flared portion 12 of the top is a band 13 preferably of metal, to the ends of which is secured, as by screws or the like 14, a handle 15, usually of a poor heat conducting material, as wood or the like.

Fitting closely into the opening at the top of pot 11 is a gasket 16 of resilient material. The outer circumference of gasket 16 is shaped to conform generally with the shape of the opening at the top of pot 11 (see Figures 1 and 3). Gasket 16 is also provided with a circular passage 17 to receive, as a relatively tight fit, the lower skirt portion 18 of a pouring spout 19. Skirt portion 18 is provided with outwardly extending spaced projections 20 which engage with the resilient material of the gasket 16 and assist in holding the pouring spout 19 in position. Such projections may however be a continuous bead if desired.

The pouring spout 19 is in the form of a truncated cone and the upper end thereof is extended outwardly as at numeral 21 (see Figure 4) to form an anti-drip pouring flange or lip. Fitting on the top of flange 21 is a cover 22 having secured thereto or formed integral therewith a counterweight 23. Counterweight 23 is pivotally mounted on the ends of a wire 24 wound around the top of the pouring spout 19 below the lip 21, the ends of the wire 24 being held in position by a clasp 25.

Preferably, the ends of the wire are outturned at approximately right angles from each other as at 24' (see Figure 6) to fit within alined holes 23' in counterweight 23. Clasp 25 is slidable longitudinally along the arms of the wire, being constructed to provide a connected pair of loops, one of which is non-detachably engaged with one arm of the wire and the other of which is detachably engaged with the other arm. By pressing the arms towards each other, the arm which is detachably fastened to the clasp may be disengaged therefrom by swinging the clasp about the other arm as a fulcrum. This is an advantage when initially assembling the structure, and also should any of the parts subsequently require replacement. The clasp and method of anchoring the wire also prevents the cover, as a unit, from swiveling laterally with respect to the pouring opening of spout 19 in the use of the device.

Fitting within the skirt portion 18 of pouring spout 19 is a measuring unit comprised of a rod 26 of appropriate length having its upper end formed into a resilient ring 27 which expansively seats into the upper end of the skirt portion 18 of the pouring spout. Rod 26 is provided along its length with spaced markings 28, designating usually the amount of water required for a specific number of cups of coffee. Frictionally slidable on rod 26 is a marker 29, here shown as of a double bevel marker design, but which may be of any desired design. Marker 29 may be slid along rod 26 to any desired one of the marks 28 and materially assists the user in determining the required level of the water in the pot 11.

Referring now to Figure 5, wherein is shown a modification of the invention illustrated in Figures 1 and 2, 30 designates a pot, similar to the pot 11, provided with the handle 15 secured to the pot 11 by the metallic band 13, arranged below the open and outwardly flared top 12. In this form however, I provide a water level gauge or marker 31 formed integral with the bottom of the pot 11, and extending upwardly therefrom to a suitable height. This water level gauge or marker 31 is provided with spaced markings 28 along its length and with the frictionally slidable marker 29 mounted thereon.

It will be understood, of course, that the structure shown in Figure 5 is adapted to receive in the open mouth thereof the gasket 16 and pouring spout 19 shown in Figure 1, but as the structure shown in Figure 5 has the integral water level gauge or marker 31, the marker rod 26 will not be used.

In use, the marker 29 is moved along the measuring rod 26 or 31 until the proper mark 28 is reached. In the embodiment of Figure 1, the spring portion 27 of rod 26 holds the rod in proper position. The proper amount of coffee is placed in the pot 11 and/or 30 and the gasket 16 with the pouring spout 19 is placed in the open end 12 of the pot. The handle 23 is then manipulated to permit pouring the necessary amount of water in the pot. This can be effected without difficulty as the marker 29 will properly indicate the water level.

The lid 22 is so constructed, that when in association with the pivoted counterweight or handle 23, it will tend to remain in engagement with the projecting lip 21 of the pouring spout 19. The lid 22 in coaction with lip 21 will thus act to prevent drip of the coffee immediately the pouring operation is discontinued and the pivoted weight or handle 23 released.

Various modifications coming within the scope of my invention will suggest themselves to those skilled in the art, and such modifications are intended to come within the scope of the appended claim.

Having thus described my invention, what I claim as new and desire to secure by Letters Patent is:

In combination, a liquid holding vessel of transparent material, a liquid level indicator located therein and visible through the walls of the vessel, means slidably mounted on said indicator for determining the level of liquid to be poured into the vessel, a pouring nozzle on the vessel having an annular skirt, the upper end of said indicator being constructed as a resilient ring to be expansively lodged within said skirt, and a gasket fitting into the open end of the vessel and supporting the pouring nozzle and liquid level indicator in operative position.

ROLAND L. SMITH.

REFERENCES CITED

The following references are of record in the file of this patent:

UNITED STATES PATENTS

| Number | Name | Date |
|---|---|---|
| 83,449 | Berney | Oct. 27, 1868 |
| 374,263 | McInnes | Dec. 6, 1887 |
| 641,108 | Hemstreet | Jan. 9, 1900 |
| 718,017 | Norris | Jan. 6, 1903 |
| 800,405 | Salotto | Sept. 26, 1905 |
| 1,264,481 | Benedict | Apr. 30, 1918 |
| 1,366,656 | Haver | Jan. 25, 1921 |
| 1,746,149 | Elsey | Feb. 4, 1930 |
| 1,814,083 | Flautt | July 14, 1931 |
| 1,859,614 | Boever | May 24, 1932 |
| 2,008,254 | Kusche | July 16, 1935 |
| 2,293,475 | Serra | Aug. 18, 1942 |
| 2,424,125 | Sieling | July 15, 1947 |

FOREIGN PATENTS

| Number | Country | Date |
|---|---|---|
| 432,355 | France | Dec. 5, 1911 |
| 773,783 | France | Nov. 26, 1934 |